３,218,120
**PROCESS FOR PREPARING SODIUM
METABORATE SOLUTIONS**
Licio Amodeo, Rosignano Solvay, Italy, assignor to
Solvay & Cie, Brussels, Belgium
Filed May 31, 1962, Ser. No. 198,897
9 Claims. (Cl. 23—59)

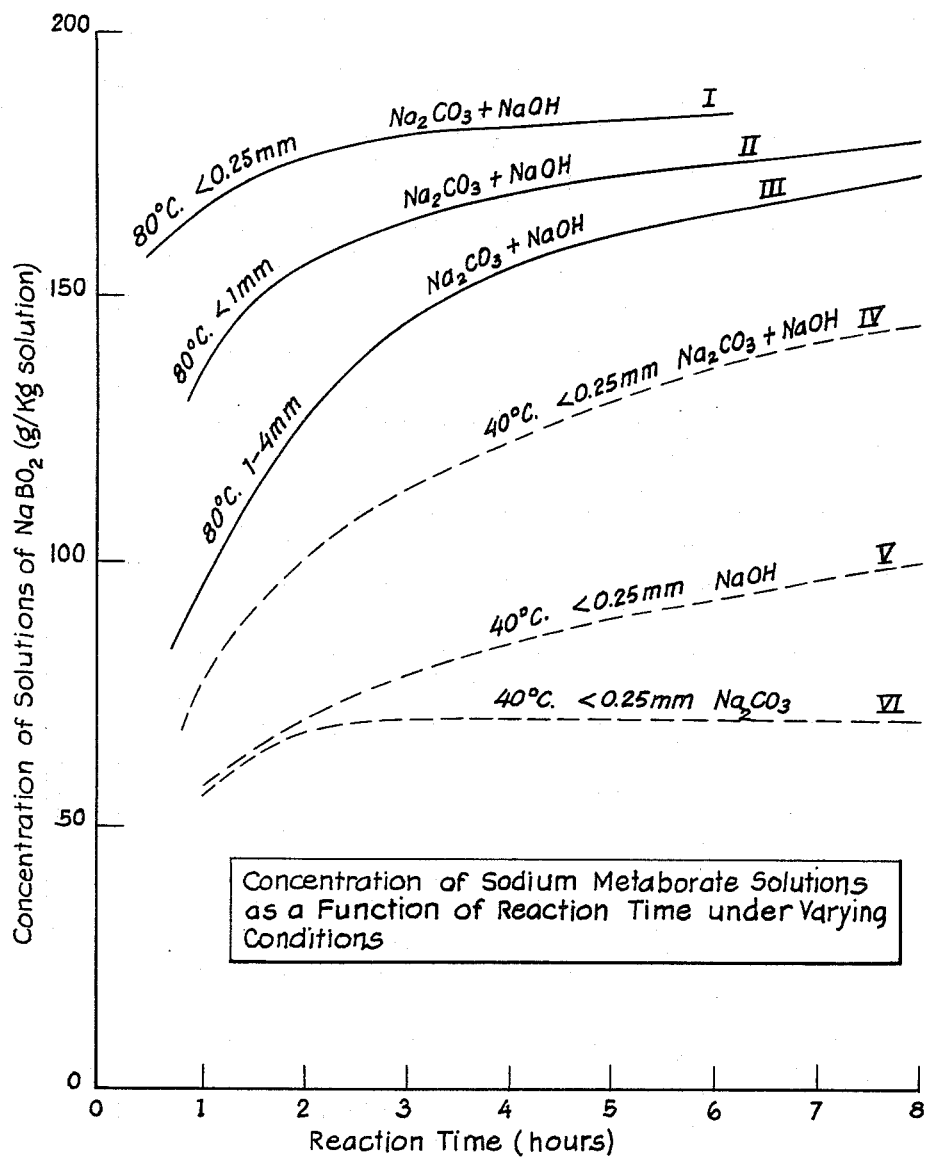

The present invention relates to a process for preparing highly concentrated aqueous solutions of sodium metaborate from complex minerals containing boron and calcium.

In the production of sodium perborate by reacting hydrogen peroxide with sodium metaborate, it is highly desirable to employ a substantially saturated aqueous solution of sodium metaborate as the starting material. To prepare such a concentrated aqueous solution of metaborate, it is possible to react a mineral containing sodium tetraborate, such as borax and rasorite, with sodium hydroxide. This latter process does, in fact, yield solutions of sodium metaborate having concentrations in the vicinity of the saturation point, without any significant technical difficulties; however, the cost of the sodium perborate product is, of course, dependent on the market value of the widely used sodium tetraborate in the mineral.

The object of the present invention, therefore, is to provide a novel process for the production of highly concentrated solutions of sodium metaborate, utilizing as raw materials, inexpensive minerals containing boron and calcium.

Other objects and advantages of the present invention will become apparent upon further study of the specification and appended claims.

To accomplish the objects of this invention, there is provided a novel process for the production of highly concentrated solutions of sodium metaborate, said process being based on borocalcic minerals, i.e., minerals containing boron and calcium. The process comprises the step of reacting the mineral in its finely divided state with an aqueous solution of sodium carbonate and caustic soda, the latter two components acting in cooperation to provide high concentrations of sodium metaborate. After the reaction, insoluble impurities such as calcium carbonate are separated from the aqueous solution of sodium metaborate by any conventional chemical engineering technique employed for separating liquids from solids, e.g., filtration, centrifugation, and the like. By operating according to this process, it is relatively easy to obtain solutions having a concentration of sodium metaborate of from 175–185 g. per kg. of solution.

With respect to the attached drawing, it is seen that said drawing graphically presents the relationship of sodium borate concentration versus reaction time wherein the effect of temperature and particle size is demonstrated. The graph also shows the beneficial effect of the combination of sodium hydroxide and sodium carbonate versus the utilization of the two materials used alone.

In the present process, it is important to determine the relative contents of the boron and calcium in the borocalcic mineral so that for the reaction there can be provided on the one hand, a slight excess of sodium carbonate to combine with the calcium values to form calcium carbonate, and on the other hand, a slight excess of sodium hydroxide to combine with the boron values to form sodium metaborate, taking into account the presence of any sodium oxide in the mineral. The term "slight excess" is intended to cover an excess of reagents in the range of 1 to 10%. It is preferred, however, to employ an excess of about 5% over the stoichiometric proportions in order to obtain a metaborate solution having a concentration near the saturation point.

The quantity of water added to the reaction medium is dependent on the desired concentration of the sodium metaborate solution, taking into account the water that is present in the treated mineral.

It is apparent that any borocalcic mineral can be converted into sodium metaborate by the present invention. Particular success has been obtained with colemanite, pandermite, inyoite, and ulexite.

In order to obtain an economically attractive rate of reaction, as well as the desired concentration of sodium metaborate, it is preferable to grind or calcine the mineral to a particle size less than 0.25 mm.

Calcination of the mineral removes a significant portion of the water of crystallization of the mineral, thereby disintegrating the mineral into a mass of small, light, porous particles having a relatively high contact area for reaction with the alkaline reagents. For example, whereas the specific gravity of ground colemanite is about 1.0 (apparent specific weight measured at free flow), the specific gravity of the calcined colemanite is only 0.45.

In general, the size of the mineral to be calcined can range from 5 to 10 cm., which particles are then subjected to a calcination time of about 2 hours at 400–600° C., preferably 500° C., to achieve complete disintegration of the minerals.

The ground or calcined material is reacted with the combination of sodium carbonate and sodium hydroxide in the previously specified proportions, at temperatures above 50° C., preferably 60–80° C., in order to obtain concentrations of 185 g. per kg. of solution. Of course, it is also possible to operate at lower temperatures, but the reaction time is necessarily increased. Conversely, the reaction temperature can be increased if desired, without any deleterious effects.

When reaction temperatures of 60–80° C. are employed with minerals which are mechanically ground to a particle size below 0.25 mm., a reaction time of about 4–5 hours is sufficient to yield a concentration of about 185 g. sodium metaborate per kg. of solution. If calcined minerals are utilized, then a reaction time of about one hour is necessary to obtain the same concentration, all other variables being the same.

Referring now to the drawing, curves I–III present the concentration of sodium metaborate as a function of reaction time at a constant temperature of 80° C., using the combination of sodium carbonate and sodium hydroxide. Curves I–III differ from one another only with respect to the particle size of the mineral which is reacted; and these curves clearly indicate that a higher concentration is achieved more rapidly when a particle size of less than 0.25 mm. is employed.

Curve IV, in comparison, represents the process of the present invention conducted at 40° C., and it is apparent that this low a temperature results in a comparatively long reaction time in order to obtain the desired concentration of sodium metaborate.

With respect to curve V, the reaction was conducted with sodium hydroxide without the addition ofسodium carbonate. Theoretically, using colemanite as an example, this reaction should proceed as follows:

$$2CaO \cdot 3B_2O_3 \cdot 5H_2O + 6NaOH \rightarrow 2Ca(OH)_2 + 6NaBO_2 + 6H_2O$$

It is apparent, therefore, that one would expect to obtain a high concentration of sodium metaborate by adjusting the water content and using a slight excess of sodium hydroxide. It is seen, however, from curve V that at 40° C., and after eight hours of reaction, the content of sodium metaborate is only 100 g. per kg. of solution. Furthermore, it is impossible to obtain concentrations of sodium metaborate using sodium hydroxide alone, even if the reaction is carried out for an infinitely long time. This fact can not be ascertained from curve V, but it has been established in another experiment wherein employing a reaction temperature of 80° C. in an effort to increase the rate of reaction, it was discovered that at equilibrium conditions the maximum concentration of sodium metaborate that is obtainable is 128 g. per kg. of solution.

Referring to curve VI, it is apparent that the results obtainable with the utilization of sodium carbonate alone, are even worse than the results obtained with sodium hydroxide used alone, the equilibrium concentration of sodium metaborate being only 70 g. per kg. of solution at 40° C. (the tetraborate obtained being conventionally calculated and expressed in grams of metaborate).

The data for curves I–VI was obtained by treating colemanite which was reduced in size by grinding, and treated with an excess of 5 percent by weight.

From the results obtained with either sodium hydroxide or sodium carbonate is used by itself, it is readily apparent that the mixture of sodium hydroxide and sodium carbonate is necessary to obtain high concentrations of sodium metaborate. As a matter of fact, these desired high concentrations cannot even be obtained by successive reactions, first with sodium carbonate, and then with sodium hydroxide, though this procedure should theoretically work efficiently. Thus, it is clear that in order to obtain high concentrations of sodium metaborate, it is necessary to employ an aqueous mixture of sodium hydroxide and sodium carbonate in a process whereby the combination of reagents reacts with the treated borocalcic mineral.

It is also to be noted that the problem of obtaining high concentrations of sodium metaborate cannot be solved by employing an excess of the minerals in solutions. This technique merely results in the sacrifice of the boron values in the mineral without any concomitant increase in the sodium metaborate concentrations. Similarly, the concentration of sodium metaborate cannot be increased by merely decreasing the water content of the solutions.

It is believed that the preceding description of the invention enables one skilled in the art to practice this invention without the necessity of further information. The preferred specific embodiments, therefore, are merely presented to illustrate the invention, and accordingly, are not intended to be limitative of the remainder of the specification or appended claims in any way whatsoever:

*Example 1*

Colemanite in particles ranging in size of from 5 to 10 cm. and having the following chemical composition is calcined in an electric furnace at a temperature of 500° C. for 2 hours:

CaO 25.9%; MgO 0.53%; $B_2O_3$ 48.75%; loss through calcination 21.77%; $Fe_2O_3 + Al_2O_3$ 0.75%; $SiO_2 +$ undecomposable silicates 1.98%; $SO_3$ 0.17%; $CO_2$ 0.03%.

To 163.5 g. of the calcined colemanite are added 105.5 g. of technical sodium carbonate being 98.8% $Na_2CO_3$ by weight, 90.5 g. of lye at a concentration of NaOH of 46.6% by weight, and 748 g. of water. After heating for 1 hour at a temperature of 80° C., the solution is filtered. Its sodium metaborate content is 184.7 g. per kg. of solution. The excess of caustic soda is 3.3 g. per kg. of solution and the excess of $Na_2CO_3$ is 6.2 g. per kg. of solution.

*Example 2*

Example 1 is repeated employing the same raw materials and the same proportions of reagents, but by heating at a temperature of 60° C. The metaborate concentration in the solution is 183.8 g. per kg. after 1 hour, and 184.6 g. per kg. after 2 hours.

*Example 3*

The procedure of the preceding examples is repeated under the same conditions, however, at a temperature of 40° C.

The metaborate concentrations are the following:

165.7 g. per kg. after 1 hour
177.8 g. per kg. after 2 hours
184.1 g. per kg. after 5 hours From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What is claimed is:

1. A process for preparing aqueous solutions containing 175–185 g. per kg. of sodium metaborate solution, which process comprises reacting at temperatures of the order of 40–80° C. a calcium borate mineral having a particle size not substantially greater than 0.25 mm. with an aqueous solution of sodium carbonate and caustic soda, the proportion of sodium carbonate being 1–10% in excess of the stoichiometric quantities necessary for reaction with the calcium of the ore to form calcium carbonate and the proportion of caustic soda being 1–10% in excess of the stoichiometric quantity necessary for reaction with the boron of the mineral to form sodium metaborate, the amount of water in said solution being dependent on the desired concentration of the metaborate.

2. The process of claim 1 wherein the reaction is conducted at temperatures above 50° C.

3. The process of claim 1 wherein the reaction is conducted at 60–80° C.

4. The process of claim 1 wherein the calcium borate particles are produced by calcining the mineral at above 400° C. for a sufficient time to eliminate the water of crystallization of the mineral.

5. The process of claim 1 wherein the calcium borate mineral is selected from the group consisting of colemanite, pandermite, inyoite and ulexite.

6. The process of claim 1 wherein the calcium borate mineral is colemanite.

7. The process of claim 1 wherein the excess of sodium carbonate and sodium hydroxide is 5%.

8. The process of claim 1, further comprising the step of separating the resultant solution of sodium metaborate from any solids.

9. A process for preparing aqueous solutions of sodium metaborate having concentrations of 175–185 g. per kg. of solution, which process comprises the steps of:

(1) calcining a calcium borate mineral selected from the group consisting of colemanite, pandermite, inyoite and ulexite, at 400–600° C. for about two hours, thereby substantially eliminating any water of crystallization and disintegrating the mineral into particles having a size less than 0.25 mm., said particles having a porous structure;

(2) reacting said particles with an aqueous solution of sodium carbonate and caustic soda, the proportion of sodium carbonate being equal to a 5% excess of the stoichiometric quantity necessary for reaction with the calcium of the ore to form calcium carbonate and the proportion of caustic soda being equal to a 5% excess of the stoichiometric quantity necessary for reaction with the boron of the ore to form sodium metaborate, the amount of water in said aqueous solution being dependent on the desired concentration of the metaborate, said reaction being conducted at 60–80° C.; and (3) separating the resultant solution of sodium metaborate from any solids.

References Cited by the Examiner

UNITED STATES PATENTS 1,468,366  9/1923  Kelly _____ 23—59

FOREIGN PATENTS 1,044,783  11/1958  Germany.

MAURICE A. BRINDISI, *Primary Examiner.*

UNITED STATES PATENT OFFICE
CERTIFICATE OF CORRECTION

Patent No. 3,218,120            November 16, 1965

Licio Amodeo

It is hereby certified that error appears in the above numbered patent requiring correction and that the said Letters Patent should read as corrected below.

In the heading to the printed specification, after line 6, insert -- Claims priority, application Netherlands, June 5, 1961, 265,555 --.

Signed and sealed this 6th day of September 1966.

(SEAL)
Attest:

ERNEST W. SWIDER
Attesting Officer

EDWARD J. BRENNER
Commissioner of Patents